Aug. 21, 1928.
R. H. SULLIVAN
1,681,265
ELECTRIC SYSTEM
Filed Sept. 8, 1924
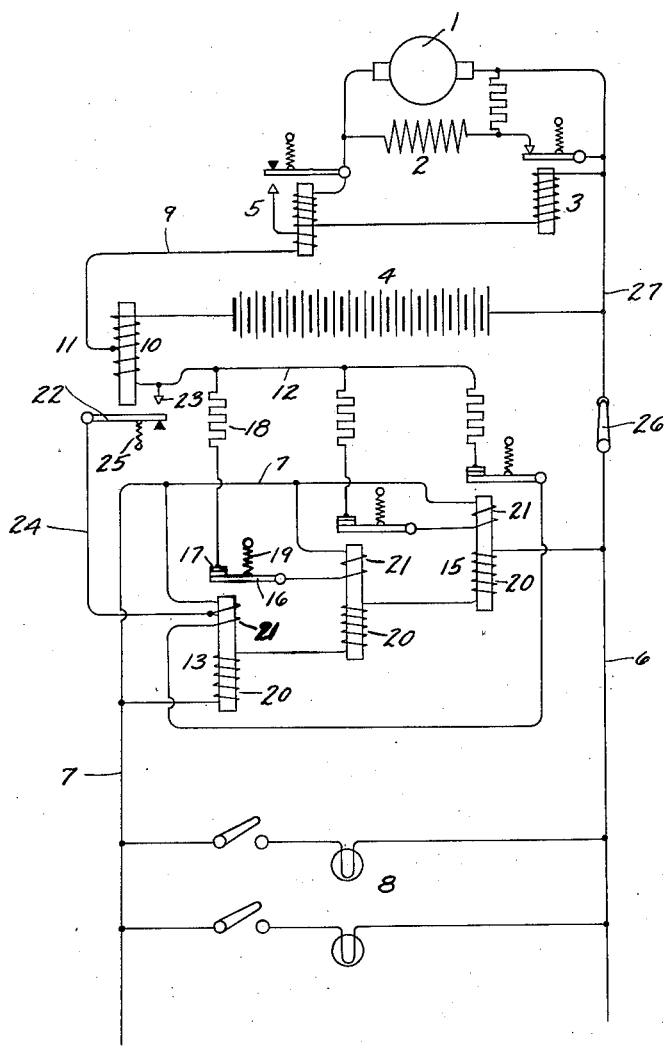
Inventor:
Raymond H. Sullivan
by his attorney
Farnum T. Worsey Patented Aug. 21, 1928.

1,681,265

UNITED STATES PATENT OFFICE.

RAYMOND H. SULLIVAN, OF ROCHESTER, NEW YORK, ASSIGNOR TO NORTH EAST ELECTRIC COMPANY, OF ROCHESTER, NEW YORK, A CORPORATION OF NEW YORK.

ELECTRIC SYSTEM.

Application filed September 8, 1924. Serial No. 736,473.

This invention relates to a system in which electric lights, or other translating-devices, are supplied by a generator and a storage-battery, connected in parallel with the supply-mains. Such systems are commonly used on motor-vehicles, and the load is shifted automatically from the battery to the generator, or vice-versa, according as the generator is or is not running at a speed sufficient to produce the necessary E. M. F. In such a system, if close regulation of the voltage on the load-circuit is desired, as for example, in the operation of electric lights, it is necessary to interpose regulating means between the supply-main and the battery and generator, since the E. M. F. across the battery terminals varies considerably, according as the battery is undergoing charge or discharge.

The object of the present invention is to produce simple and effective regulating means for the purpose in question, and particularly means in which only instruments in the form of relays, controlling resistances, are required.

To the foregoing end it is proposed to interpose, between the generator and battery and one of the supply-mains, a plurality of resistors each controlled by the contacts of a regulating relay, the resistors being arranged in parallel and all of the relays being adjusted to respond to the same predetermined voltage across the supply-mains. In order to distribute the load as equally as possible between the relays, they are interconnected, through suitable windings, in the manner hereinafter set forth. A further feature of the invention is the use of a shunt-relay controlled in accordance with the quantity of current flowing in the supply-mains and acting to shunt out the resistances just mentioned when the conditions are such that the predetermined E. M. F. across the mains could not otherwise be maintained.

Other features of the invention will be set forth in connection with the following description of the preferred embodiment thereof.

The accompanying drawing is a conventionalized diagram of a system embodying the present invention.

The invention is illustrated as embodied in a system in which a shunt-wound generator 1 is used, the generated voltage being regulated by controlling the current through the field-winding 2 by means of a vibratory regulator 3, in a well known manner. The storage-battery 4 is connected in parallel with the generator, through a magnetic cut-out 5 of ordinary form.

The supply-mains 6 and 7 supply lighting circuits 8, or other translating-devices. The main conductor 6 is connected, through a switch 26 and a wire 27, directly with one terminal of the generator and of the battery, while the main conductor 7 is connected with the opposite terminals through the regulating means of the present invention.

The cut-out 5 is connected, by a wire 9, with an intermediate point of the winding 10 of the shunt-relay 11 before mentioned. One end of this winding is connected with the battery, while the other end is connected with a wire 12. The E. M. F. across the supply-mains is regulated by controlling the flow of current from the wire 12 to the wire 7, and for this purpose a set of relays 13, 14 and 15 is used. Each of these relays has an armature 16 cooperating with a fixed contact 17, and each contact is connected with the wire 12 through a resistor 18. The resistors may be and preferably are of equal resistance. The armatures are controlled by springs 19, and the magnets of the relays are energized by windings 20 which are connected across the supply-mains 6 and 7 so that the relays are more or less energized according to the E. M. F. across these mains. The several relays are preferably all adjusted to respond, as nearly as possible, to the same predetermined voltage, so that when this voltage is exceeded they will all tend to open their contacts and more or less interrupt the flow of current through the resistors 18. Since the armatures 16 are all connected with the wire 7, the feed of current to this wire is thus controlled as required to maintain the desired E. M. F.

If the three relays could be adjusted exactly alike they would all act simultaneously, thus momentarily causing complete interruption of the current to the conductor 7 and causing flickering of the lights 8. Such exactitude is in fact impossible, and the relays therefore tend to act in series and to increase the resistance in the load-circuit gradually through a narrow range of voltage. It is preferable, moreover, to make the relay contacts of carbon, so that the resistance between the contacts is increased gradually, to a certain extent, owing to diminution of the pressure of their engagement as the voltage rises. In this way, and by the use of a sufficient number of relays in parallel, a very smooth regulation of the load circuit may be secured.

However closely the regulating relays may be adjusted to the given voltage, one or other of them will always tend to assume exclusively the burden of regulation under certain conditions of load, battery-voltage etc. This is particularly the case when conditions are relatively stable, as when a fixed number of lamps is being supplied by the battery alone, the generator being, at the time, out of operation. Under such conditions the heating and sparking at the contacts of such one relay might become excessive, and it is desirable, therefore, to distribute the work more equally among the relays. This is accomplished by so interconnecting the relays that each one, when acting, tends to throw one of the others into action also. For this purpose each relay is provided with a winding 21 of a few turns, which is connected in series with the wire 7 and the armature 16 of one of the other relays. The windings 21 are thus energized whenever the corresponding armatures are in closed-circuit position, and they are so arranged that they then have a slight demagnetizing or "bucking" effect.

Whenever one of the armatures moves to open-circuit position, thus interrupting the current through the bucking winding 21 of the next relay, the magnet of the latter is thereby slightly strengthened, so that the armature of the second relay moves to open its circuit, thus throwing the third relay into action. This action occurs continuously around the series or circle of relays, so that they all vibrate rapidly and continuously whenever the load-circuit voltage exceeds the predetermined amount. In this way the work is so distributed that none of the relays becomes overheated and all of the contacts are subjected uniformly to such wear and consumption as is incidental to their operation.

In the operation of the apparatus, as so far described, the minimum resistance between the sources of supply and the supply-main is that of the resistors 18 acting in parallel. If, then, a heavy load be thrown on, and if the generator be idle, or operating at low speed, so that the current is supplied largely or wholly by the battery, the resistance in question, plus the internal resistance of the battery, alone or in parallel with the generator, may be sufficient to prevent maintainance of the desired voltage on the supply-mains. To meet this condition the shunting-relay 11 is used. The armature 22 of this relay cooperates with a contact 23 of the wire 12, and the armature connected with the wire 12, and the armature is connected, through a wire 24, with the winding 21 on the relay 13, and thus with the supply-main 7. A spring 25 holds the armature 22 normally in open-circuit position, but whenever the current flowing from the battery through the winding 10, either with or without current from the generator flowing through the lower part of the winding, exceeds a certain amount measured in ampere-turns, the armature 22 is raised, and by engagement with its contact 23 it closes a shunt-circuit around the resistors 18 and permits the supply-mains to be fed directly.

Under the conditions just described, if the speed and the terminal voltage of the generator be increased, this tends to diminish or reverse the direction of current in the upper part of the winding 10, until the spring 25 acts to restore the armature 22 to open-circuit position and throw the regulating relays again into operation.

The relay 11 will be effective, when the generator is entirely out of operation, even if the wire 9 be connected to the wire 12 entirely below the winding of the shunting-relay, but for best results it has been found preferable to connect it as described, either at the middle point of the winding 10 or a little below this point.

For best results with the shunting-relay it is desirable that its contacts be made of material of low resistance, such as silver. Such material is injuriously affected by sparking, and it is desirable, therefore, to avoid breaking the circuit at these contacts. It is for this reason that the wire 24 is connected to an intermediate point on the winding 21. Whenever the contacts of the shunting-relay are closed a heavy current is thus directed through this winding, and the bucking effect of this current causes the armature of the relay 13 to remain in closed-circuit position, with the corresponding resistor 18 thus connected across the contacts of the shunting-relay. When these contacts are opened, therefore, the circuit is not completely broken by them, and sparking between them is thus rendered negligible. The wire 24 might be connected to the lower end of the winding 21, but this is not necessary to secure the desired result, and it is preferable to introduce as little resistance as possible into the circuit controlled by the shunting-relay.

When the apparatus is not in use the switch 26 may be opened to prevent waste of current from the battery, through the relay-windings 20.

Owing to the heat generated at the contacts of the relays, and to variations in atmospheric temperature, it is desirable to compensate the regulating relays for temperature if close control of the voltage is desired. This may be done in any ordinary or suitable manner. The number of regulating relays to be used depends chiefly on the capacity of the system and on the degree to which closeness of regulation is desirable. The greater the number of relays the higher the resistance of each resistor 18 may be, so that a large number of relays tends to smooth operation and to increased life of the contacts.

The inventor is aware that it has been proposed to control the voltage of a supply-circuit by means of resistors connected all in series therewith and controlled by a series of relays arranged to shunt out the resistors successively. In such a system, however, the several relays must be adjusted accurately to respond in a definite order to minute differences in voltage. The contacts of such relays, moreover, must be made of low-resistance metal, since substantially the entire load-current must flow through all of such contacts in series under certain conditions. The parallel arrangements of the relays and resistances in the present system avoids the necessity of adjusting the relays to respond in any definite order, and it also renders practicable the use of carbon contacts, with resulting advantages well known to those skilled in the art.

The invention claimed is:

1. In an electric system comprising a source of current at variable voltage, and supply-mains connected with said source, means, for regulating the E. M. F. across said supply-mains, comprising: a plurality of resistors connected in parallel between said source and one of said supply-mains; and a plurality of relays connected in series with, and controlling the flow of current through said resistors, respectively; the relays being energized by connection with the supply-mains and being responsive to substantially the same E. M. F. across these mains.

2. An electric system, as set forth in claim 1, in which each of said relays is interconnected with another by means acting, when one relay moves to open-circuit position, to increase the tendency of said other relay to move to open-circuit position.

3. An electric system, as set forth in claim 1, in which each relay is provided with a winding controlled by another of said relays and tending to cause the first relay to open the circuit which it controls whenever said other relay moves to open-circuit position.

4. Regulating-means, for an electric system, comprising: a plurality of resistors connected in parallel; and a plurality of relays each having its contacts connected in series with one of said resistors; each relay having a main winding and a bucking winding, and the bucking winding of each relay being connected in series with the resistor and the contacts of another of said relays.

5. An electric system comprising: a source of current at variable voltage; supply-mains connected with said source of current; a resistor connected between said source and one of said mains; a regulating-relay responsive to E. M. F. across said mains and having its contacts connected in series with said resistor; and a shunting relay having contacts arranged to short-circuit said resistor, the winding of the shunting relay being connected in series with said source of current, so that the shunting relay is responsive to the volume of current in the supply-circuit.

6. An electric system as set forth in claim 5, in which said regulating relay is provided with a bucking winding connected in series with the contacts of said shunting relay, so that the contacts of the regulating-relay remain closed whenever the contacts of the shunting relay are closed.

7. An electric system comprising: a source of current, at variable voltage; supply-means connected with said source; a plurality of resistors connected in parallel between said source and one of said supply-mains; a plurality of regulating relays having contacts severally controlling the flow of current through the respective resistors, each regulating relay having a main winding connected across the supply-mains, and a bucking-winding connected in series with the contacts of another regulating relay; and a shunting relay having contacts connected to short-circuit said resistors and the contacts of the regulating relays, the winding of the shunting relay being connected in series with said source of current and the contacts being connected in series with the bucking-winding on one of the regulating relays.

8. An electric system comprising: a storage-battery; an electric generator; a supply-main connected to one terminal each of the battery and the generator; a second supply-main; connections, between the latter main and the generator and the battery including a voltage-regulator; a shunting-relay connected to short-circuit the voltage-regulator when its contacts are closed; and a winding, on the shunting relay, connected at its ends, respectively, to the storage-battery and said voltage-regulator, and connected, at an intermediate point, with the second terminal of the generator.

RAYMOND H. SULLIVAN.